(12) United States Patent
Richter et al.

(10) Patent No.: US 9,234,563 B2
(45) Date of Patent: Jan. 12, 2016

(54) BELT HAVING A DETACHABLE END CONNECTION

(75) Inventors: Thomas Richter, Vorra (DE); Heiko Lang, Worms (DE)

(73) Assignee: HABASIT AG, Reinach (CH)

( * ) Notice: Subject to any disclaimer, the term of this patent is extended or adjusted under 35 U.S.C. 154(b) by 8 days.

(21) Appl. No.: 14/118,245

(22) PCT Filed: May 15, 2012

(86) PCT No.: PCT/CH2012/000105
§ 371 (c)(1),
(2), (4) Date: Nov. 18, 2013

(87) PCT Pub. No.: WO2012/155281
PCT Pub. Date: Nov. 22, 2012

(65) Prior Publication Data
US 2014/0106918 A1    Apr. 17, 2014

(30) Foreign Application Priority Data

May 17, 2011    (CH) .......................... 829/11

(51) Int. Cl.
*F16G 15/10*    (2006.01)
*F16G 3/00*     (2006.01)
*F16G 1/16*     (2006.01)
*F16G 1/28*     (2006.01)
*F16G 3/02*     (2006.01)
*B29C 65/56*    (2006.01)
(Continued)

(52) U.S. Cl.
CPC .. *F16G 3/00* (2013.01); *F16G 1/16* (2013.01); *F16G 1/28* (2013.01); *F16G 3/02* (2013.01); *B29C 65/02* (2013.01); *B29C 65/562* (2013.01); *B29C 65/564* (2013.01); *B29C 66/304* (2013.01); *B29C 66/4322* (2013.01); *B29C 66/4324* (2013.01); *B29C 66/5241* (2013.01); *B29C 66/73921* (2013.01)

(58) Field of Classification Search
CPC ......... F16G 13/06; F16G 15/00; F16G 15/04; F16G 13/16; F16G 15/02
USPC ........................................................ 474/218
See application file for complete search history.

(56) References Cited

U.S. PATENT DOCUMENTS 3,342,656 A * 9/1967 Papageorges ................ 156/159
3,744,095 A   7/1973 Tomlinson
(Continued)

FOREIGN PATENT DOCUMENTS

CH    665009 A5    4/1988
CN    1142580 A    2/1997
(Continued)

*Primary Examiner* — Henry Liu
(74) *Attorney, Agent, or Firm* — Hodgson Russ LLP

(57) ABSTRACT

A belt (1) comprises a tension layer (4), a first end portion (2) at a first longitudinal end, a second end portion (3) at a second longitudinal end, and an end connection for connecting the two end portions (2, 3). Here, the end connection comprises a first connection element (21), which is fastened to the first end portion (2), and a second connection element (31), which is fastened to the second end portion (3), wherein the first connection element (21) and the second connection element (31) are releasably interconnectable and are formed from an elongation-resistant material. The first connection element (21) and the second connection element (31) are each formed in one piece and, together with the tension layer (4), form a single neutral bending plane.

16 Claims, 4 Drawing Sheets

Figure 1:
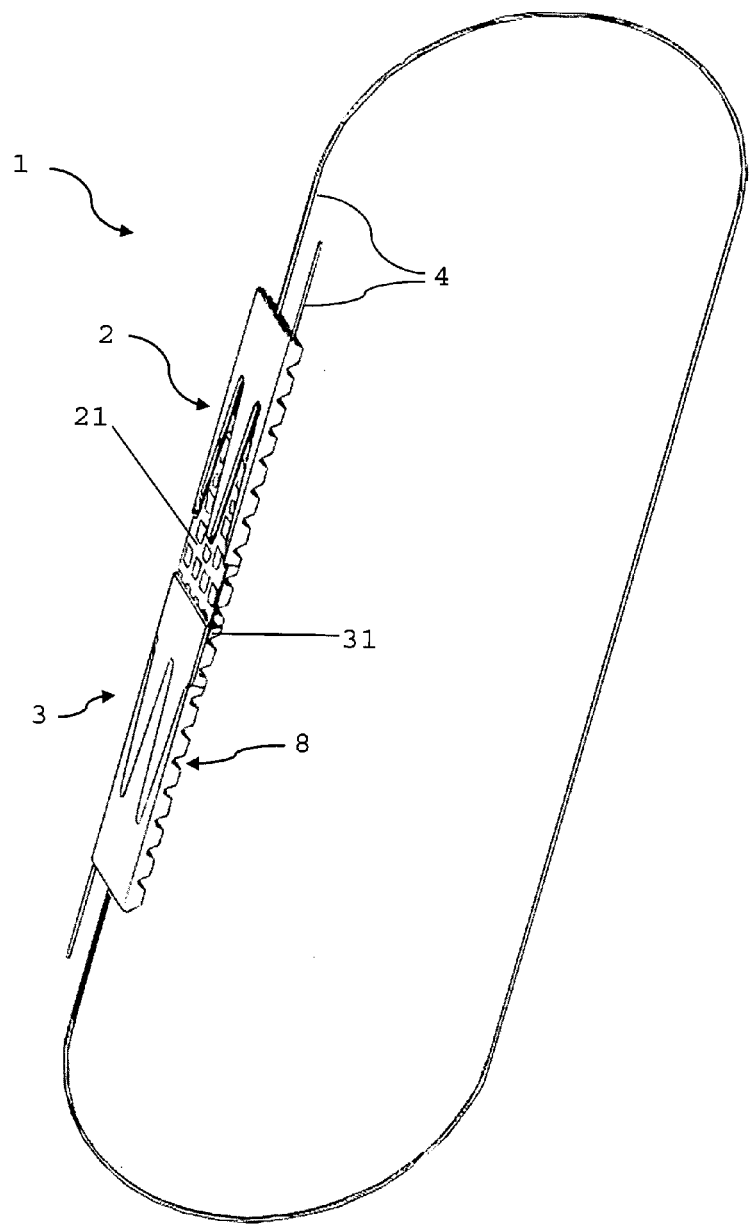

(51) Int. Cl.
 *B29C 65/00* (2006.01)
 *B29C 65/02* (2006.01)

(56) References Cited

U.S. PATENT DOCUMENTS

| | | | | |
|---|---|---|---|---|
| 4,170,281 A | * | 10/1979 | Lapeyre | 198/844.2 |
| 5,467,867 A | * | 11/1995 | Musil et al. | 198/844.2 |
| 6,695,134 B2 | * | 2/2004 | Rubino et al. | 198/851 |
| 6,843,744 B2 | * | 1/2005 | Gregg et al. | 474/254 |
| 7,594,574 B2 | * | 9/2009 | Mol et al. | 198/844.2 |
| 8,002,110 B2 | * | 8/2011 | DeGroot et al. | 198/844.2 |
| 8,695,790 B2 | * | 4/2014 | Ridgell et al. | 198/844.2 |
| 8,714,345 B2 | * | 5/2014 | Frey | 198/844.2 |
| 2002/0148707 A1 | * | 10/2002 | Tarnawskyj et al. | 198/844.2 |
| 2003/0146072 A1 | * | 8/2003 | Rubino et al. | 198/844.2 |
| 2004/0195079 A1 | * | 10/2004 | Webster et al. | 198/844.2 |
| 2007/0267277 A1 | | 11/2007 | Mol et al. | |
| 2008/0207370 A1 | | 8/2008 | Jakob | |
| 2010/0029426 A1 | | 2/2010 | Pons Sanchez | |
| 2011/0267739 A1 | * | 11/2011 | Yeager et al. | 361/323 |

FOREIGN PATENT DOCUMENTS

| | | |
|---|---|---|
| CN | 201258945 Y | 6/2009 |
| DE | 2359712 A1 | 6/1975 |
| DE | 2453463 A1 | 5/1976 |
| DE | 29615292U U1 | 10/1996 |
| DE | 196 34 908 A1 | 5/1998 |
| DE | 10037645 A1 | 2/2002 |
| DE | 202009003649 U1 | 5/2009 |
| EP | 2116487 A1 | 11/2009 |
| FR | 2867764 A1 | 9/2005 |
| WO | 0111259 A1 | 2/2001 |

* cited by examiner

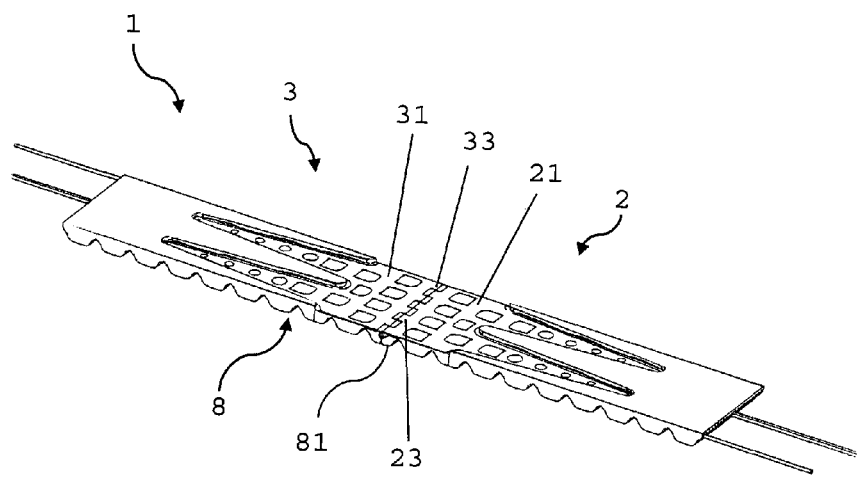
Fig. 3
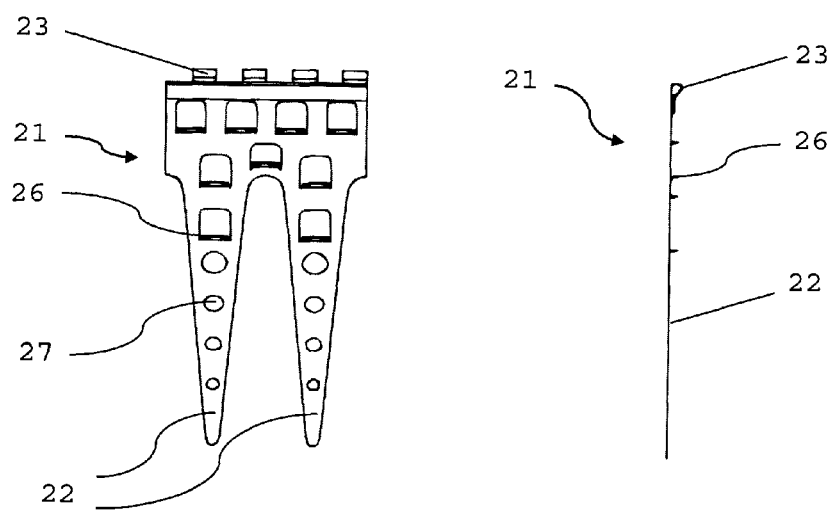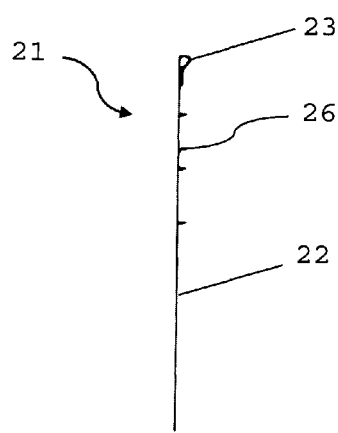
Fig. 4           Fig. 5

BELT HAVING A DETACHABLE END CONNECTION

The present invention relates to a belt having a releasable end connection for connecting end portions of the belt.

Belts of this type are generally conveyor belts, drive belts or timing belts. Reference is also made to bands, this term being used equivalently hereinafter for the purpose of clarity. These belts are flexible and can have different cross sections, that is to say they can be wedge-shaped or flat for example. The applications are manifold, wherein in particular the transmission of a force and the transport of a material to be conveyed are of importance. In addition, timing belts are also used, with which either a periodic sequence or a spatial position of devices is controlled. Belts are sometimes not produced endlessly, but at their two longitudinal ends have end portions which are then interconnected indirectly or directly.

A releasable end connection for a toothed belt is known from US 2003/0146072 A1, which toothed belt is provided with a tension layer, on which is arranged an upper layer above, on which a material can be conveyed, and beneath a lower layer, which has a toothing. The toothed belt comprises at its two longitudinal ends first and second connection elements, which can be coupled via a connecting rod. The first and the second connection elements each have clamps and fastening layers, wherein the clamps are each hooked into the tension layer from above and below in each case via a fastening layer. It is problematic here that the clamps are arranged outside the neutral bending plane formed by the tension layer and are fastened by additional fastening layers to the tension layer.

This has a negative effect on the running properties of belts of this type.

For the releasable end connection of belts in the end portions of the belts, it is also known from DE 296 15 292 U1 to provide fabric plies, to which helical wire elements made of plastic or metal are attached at the end face. When end-connecting the belt, the helical wire elements engage in one another and a coupling rod is passed through the helical wire elements engaging in one another in such a way that the two end portions are thus coupled to one another. These belts and this connection type have the disadvantage that, due to the helical wire elements and fastening thereof to the end portions via fabric plies, the permissible tensile loading is heavily restricted, since the belt may otherwise be stretched, which is no longer acceptable in many applications, in particular in view of a possible stretch slip of such belts.

The object of the present invention is therefore to create a belt having a releasable end connection of the type mentioned in the introduction, which does not have the disadvantages of the belts in the prior art and which in particular is designed to take up high tensile forces and has good running properties.

This object is achieved by the belt according to the invention having an end connection as it is defined in patent claim 1. Patent claim 12 relates to a method according to the invention for producing such a belt. Preferred variants will emerge from the dependant patent claims.

The essence of the invention is as follows: A belt has a tension layer, a first end portion at a first longitudinal end, a second end portion at a second longitudinal end, and an end connection for connecting the two end portions. The end connection comprises a first connection element, which is fastened to the first end portion, and a second connection element, which is fastened to the second end portion, wherein the first connection element and the second connection element are releasably interconnectable and are formed from an elongation-resistant material. The first connection element and the second connection element are each formed in one piece and, together with the tension layer, form a single neutral bending plane. In addition, the first connection element and the second connection element each have at least one finger element embedded in a finger-like manner in the first and second end portion, respectively, such that the tension layer and the finger elements engage in one another in a finger-like manner in the region of the first and second end portion, respectively.

The number and form of such finger elements can be selected in accordance with the desired connection strength between the tension layer and the connection elements. The finger-like engagement in one another makes it possible for the tension layer to be continued along the single neutral bending plane by the finger elements within the first end portion and the second end portion since parts of the tension layer are arranged next to the finger elements. The finger elements can thus be arranged within the belt at the height of the tension layer, and it is not necessary to arrange the connection elements above or below the tension layer.

Due to the formation of the first connection element and of the second connection element from an elongation-resistant material, the stretching of the end connection of the belt under tensile load is minimised, and the tensile strength is increased on the whole.

The term elongation resistance is to be understood to mean the resistance that a material puts up to its deformation, more specifically in relation to its geometry, that is to say the cross-sectional area and the length of a material piece. The elongation resistance D is defined as the product of the modulus of elasticity E and the cross-sectional area A, that is to say $D = E \cdot A$.

The arrangement of the connection elements and of the tension layer in a single neutral bending plane improves the running properties of the belt, and the durability thereof is extended on the whole, in particular also since an excessively quick material fatigue in the region of the end connection is avoided. The neutral bending plane determines the region of the belt of which the length does not change in the event that the belt bends.

A further advantage of the belt according to the invention is that the connection elements are each formed in one piece and are connected directly to the end portions of the belt. Additional elements for fastening the connection elements to the end portions are not required, which on the one hand reduces the constructional effort and on the other hand increases strength.

In an advantageous variant, the first connection element and the second connection element are made of steel, in particular spring steel, which enables a particularly elongation-resistant connection with an inexpensive material that is easily worked.

The first connection and the second connection element are preferably formed from an elongation-resistant material having a modulus of elasticity of at least 10 GPa ($10 \cdot 10^9$ N/m$^2$), in particular at least 190 GPa ($190 \cdot 10^9$ N/m$^2$).

The first connection element and the second connection element are advantageously formed from a bending flexible material. Here, the bending flexibility of the belt can be retained in the end portions by forming the connection elements bending flexibly in accordance with the bending flexibility of the tension layer or of the belt. As a result, the bending flexibility can thus be kept substantially constant along the entire belt.

The connection between the connection elements and the tension layer is preferably achieved via the intermediate belt material, in which both the connection elements and the tension layer are embedded.

The tension layer preferably comprises a plurality of tension carriers, in particular tension cables, wherein the design of the tension carriers can be manifold in view of the form and the cross section. The number of tension carriers can be selected depending on the finger elements provided or vice versa, such that for example at least one tension carrier is provided on either side of each finger element.

The first connection element and the second connection element advantageously each comprise protrusions and/or recesses for improved anchoring in the first and second end portion, respectively. A simple incorporation of the connection elements is thus possible, and at the same time a secure hold is ensured in the direction of tension due to a form fit.

In accordance with an advantageous variant, the first connection element comprises a first coupling element having first eyelets, and the second connection element comprises a second coupling element having second eyelets, wherein the first coupling element and the second coupling element are interconnectable by a hinge rod, which can be passed through the first and second eyelets engaging between one another. The first coupling element can thus be connected in a simple manner to the second coupling element in order to close the belt. Other coupling variants are also conceivable in which the coupling can be implemented indirectly or directly. The hinged embodiment of the coupling is also merely exemplary and is not mandatory.

It has been found that the present invention is particularly advantageous if the belt is a toothed belt, since, due to the elongation resistance even in the region of the end connection, it can be ensured that the toothed belt sits on its driving elements in a form-locked manner.

For the running properties of the toothed belt, it has proven to be advantageous for the toothed belt in accordance with a preferred variant to have a continuous toothing in the region of the end connection. This enables a constant form fit during the circulation of the toothed belt since no teeth are missing.

To open and/or close the toothed belt, the toothing advantageously has a divided tooth in the region of the end connection.

The belt is preferably made at least in part of a thermoplastic material, apart from the tension layer and the end connection. This enables a simple production of the belt having an end connection by means of thermal joining.

The method according to the invention for producing a belt having a tension layer, a first end portion at a first longitudinal end, a second end portion at a second longitudinal end, and an end connection for connecting the two end portions, wherein the end connection comprises a first connection element, which is fastened to the first end portion, and a second connection element, which is fastened to the second end portion, wherein the first connection element and the second connection element are each formed in one piece from an elongation-resistant material, are releasably interconnectable and, together with the tension layer, form a single neutral bending plane, comprises, inter alia, the following steps:

a) connecting the first connection element to the second connection element;

b) connecting the first connection element to the first end portion and connecting the second connection element to the second end portion by melt compression moulding in such a way that the first connection element and the second connection element, together with the tension layer, form a single neutral bending plane; and c) separating the first connection element from the second connection element.

In accordance with an advantageous variant, in method step b), the first and the second connection element are positioned before the melt compression moulding between a thermoplastic lower part and a thermoplastic upper part. Such a positioning simplifies the arrangement of the connection elements at the height of the tension layer of the belt. The thermoplastic lower part and the thermoplastic upper part may each be formed in two pieces and removed previously from the end portions of the belt.

Figure 2:
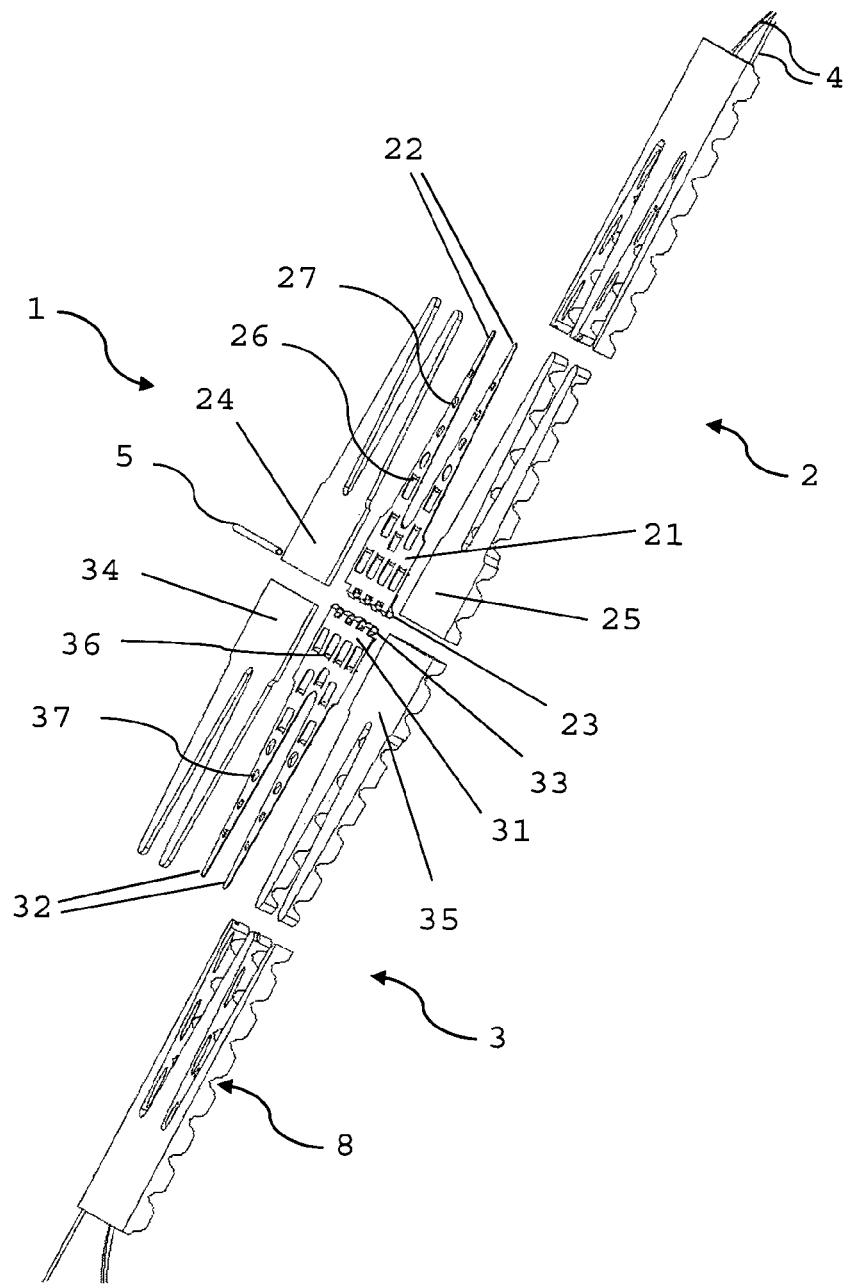
Figure 6:
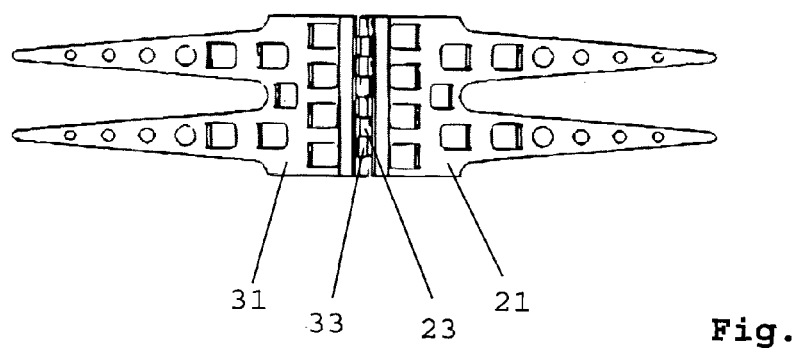
Figure 7:
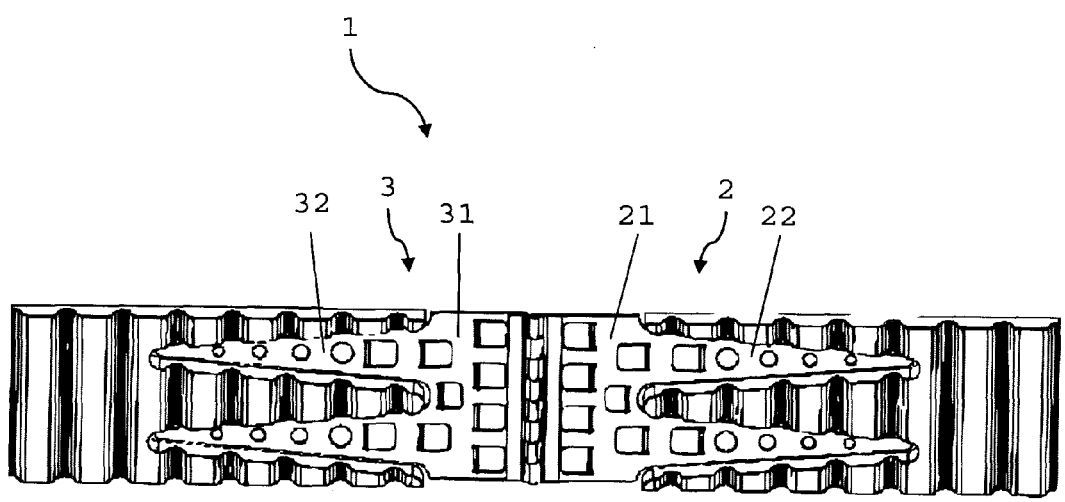

The belt according to the invention will be described in greater detail hereinafter with reference to the accompanying drawings on the basis of an exemplary embodiment. In the drawings:

FIG. 1—shows a perspective view of part of an exemplary embodiment of the belt according to the invention having an end connection;

FIG. 2—shows an exploded illustration of the connection region of the belt from FIG. 1;

FIG. 3—shows a perspective view of connection elements embedded in the end portions of the belt;

FIG. 4—shows a plan view of a connection element of the belt from FIG. 1;

FIG. 5—shows a side view of the connection element from FIG. 4;

FIG. 6—shows a plan view of interconnected connection elements of the belt from FIG. 1;

FIG. 7—shows a view from below of connection elements embedded in the end portions of the belt.

The following statement is true for the description hereinafter: If, in a figure, reference signs are indicated for the purpose of clarity of the drawings but are not mentioned in the part of the description associated directly, reference is made to the previous or following parts of the description for an explanation of these reference signs. Conversely, in order to avoid overcomplicating the drawings, reference signs that are less relevant for immediate understanding are not shown in all figures. In this case, reference is to be made to the other figures.

The exemplary embodiment illustrated in FIGS. 1 to 7 of a belt 1 according to the invention comprises, according to FIG. 1, a first end portion 2, to which a first connection element 21 is attached, and a second end portion 3, to which a second connection element 31 is attached. The two connection elements 21 and 31 are interconnected here via a hinge rod, as explained in detail further below. The belt 1 additionally has a tension layer 4, which is formed here by a plurality of parallel tension cables, of which only two are illustrated, wherein one of the illustrated tension cables indicates the course of the belt 1 shown only in part. The belt 1 is formed as a toothed belt and has a toothing 8 on its running side.

The tension layer 4, together with the first connection element 21 and the second connection element 31, forms a neutral bending plane of the belt 1, wherein this is to be understood to mean the region of the belt 1 of which the length does not change as the belt bends. To this end, the first connection element 21 is arranged within the first end portion 2 and the second connection element 31 is arranged within the second end portion 3, in each case at the height of the tension layer 4. The tension cables of the tension layer 4 reach into the first and second end portions 2 and 3 such that they extend in the region of the end portions 2, 3 next to parts of the connection elements 21 and 31 respectively and, together therewith, thus form the neutral bending plane of the belt 1 in said end connection region.

The force-locked connection between the tension cables of the tension layer 4 and the connection elements 21, 31 is achieved via the belt material, in which the tension cables and the connection elements 21, 31 are embedded. The belt material is preferably thermoplastic material, which enables a simple embedding process by means of known methods.

FIG. 2 is an exploded illustration of the end connection of the belt. It can be seen that the first end portion 2 comprises a first upper part 24 and a first lower part 25, which are separate from the rest of the first end portion 2 and between which the first connection element 21 is arranged. The first connection element 21 is formed with two finger elements 22, whereas the first upper part 24 and the first lower part 25 have accordingly shaped finger elements. These finger elements engage in the assembled state in complementary gaps in the rest of the first end portion 2 and are melted therewith in a melt compression moulding press. The first upper part 24 and the first lower part 25 enable a positioning of the first connection element 21 at the height of the tension layer 4 and an alignment in accordance with the neutral bending plane.

Similarly, the second end portion 3 comprises a second upper part 34 and a second lower part 35, which are separate from the rest of the second end portion 3 and between which the second connection element 31 is arranged. The second connection element 31 is formed with two finger elements 32, whereas the second upper part 34 and the second lower part 35 have accordingly shaped finger elements. These finger elements engage in the assembled state in complementary gaps in the rest of the second end portion 3 and are melted therewith in a melt compression moulding press. The second upper part 34 and the second lower part 35 enable a positioning of the second connection element 31 at the height of the tension layer 4 and an alignment in accordance with the neutral bending plane.

In this exemplary embodiment, the two end portions 2, 3 are made completely of a thermoplastic material, apart from the tension layer 4, which enables optimal melting of the upper parts 24, 34 with the respective lower parts 25, 35, such that the thermoplastic material during melt compression moulding passes through recesses 27, 37 provided in the connection elements 21, 31 and thus anchors the connection elements 21, 31 optimally in the end portions 2, 3. In order to increase the tensile strength of the end connection, protrusions 26, 36 are additionally formed on the connection elements 21, 31 and anchor the connection elements 21, 31 more strongly in the end portions 2, 3.

To close the belt 1 or connect the ends thereof, the first connection element 21 has a first coupling element 23 with a plurality of eyelets, and the second connection element 31 has a second coupling element 33 with a plurality of eyelets which are offset laterally with respect to the eyelets of the first coupling element 23, it being possible to hinge the first and second coupling elements to one another via a hinge rod 5.

In FIG. 3, the connection elements 21, 31 embedded in the belt 1 are illustrated in the closed state of the belt 1, wherein the upper parts 24, 34 are omitted for improved clarity. The hinged connection between the first connection element 21 and the second connection element 31 is provided in such a way that the toothing 8 of the belt 1 is continued in the region of the end connection, that is to say also there all teeth are formed. Here, a tooth 81 divided into two is provided in the region of the connection of the first coupling element 23 to the second coupling element 33 and enables a simple opening and closing of the belt 1.

FIG. 4 shows a plan view of the connection element 21, and FIG. 5 shows the corresponding side view. The second connection element 3 is formed identically in principle. The two finger elements 22 and also the recesses 27 and the protrusions 26, which also extend along the two finger elements 22, can be clearly seen. The coupling element 23 in the present case comprises four eyelets, which are arranged in a spaced manner at the end face of the connection element 21 in such a way that the eyelets of the coupling element 33 of the connection element 3 can engage therebetween such that the two coupling elements 23 and 33 can be connected in a hinged manner by means of the hinge rod 5.

The connection between the first connection element 21 and the second connection element 31 is clear from the plan view in FIG. 6, wherein the offset arrangement of the eyelets of the first coupling element 23 relative to the eyelets of the second coupling element 33 can be seen. This arrangement enables the connection of the first connection element 21 to the second connection element 31 in one plane, without overlap, such that a single neutral bending plane can be formed. The coupling is achieved by the hinge rod 5, which is inserted fully here.

The connection elements 21, 31 embedded in the belt 1 are illustrated in FIG. 7 in the closed state of the belt 1 in a view from below, wherein the lower parts 25, 35 have been omitted for improved clarity, such that the toothing 8 of the belt 1 is illustrated in an interrupted manner, which is not actually the case. The first connection element 21 and the second connection element 31 are arranged within the belt 1 in the region of the neutral bending plane above the region of the toothing 8.

Besides the exemplary embodiment illustrated in FIGS. 1 to 7, a large number of further embodiments of the invention are of course conceivable, in particular with regard to the design of the connection elements and the tension layer.

The invention claimed is:

1. Belt having a tension layer, a first end portion at a first longitudinal end, a second end portion at a second longitudinal end, and an end connection for connecting the two end portions, wherein the end connection comprises a first connection element, which is fastened to the first end portion, and a second connection element, which is fastened to the second end portion, wherein the first connection element and the second connection element are releasably interconnectable and are each formed in one piece from an elongation-resistant material;

wherein the first connection element and the second connection element, together with the tension layer, form only a single neutral bending plane, the single neutral bending plane corresponding to a region of the belt of which the length does not change as the belt bends, and each have at least one finger element embedded with material of the belt in a finger-like manner in the first and second end portion, respectively, such that the tension layer and the finger elements engage in one another in a finger-like manner in a region of the first and second end portion, respectively, the tension layer and the finger elements being positioned on the single neutral bending plane.

2. Belt according to claim 1, wherein the first connection element and the second connection element are made of steel.

3. Belt according to claim 1, wherein the first connection element and the second connection element are formed from an elongation-resistant material having a modulus of elasticity of at least 10 GPa.

4. Belt according to claim 1, wherein the first connection element and the second connection element are formed from a bending flexible material.

5. Belt according to claim 1, wherein the tension layer comprises a plurality of tension carriers.

6. Belt according to claim 1, wherein the first connection element and the second connection element comprise protrusions and/or recesses for improved anchoring in the first and second end portion, respectively.

7. Belt according to claim 1, wherein the first connection element has a first coupling element having first eyelets, and the second connection element has a second coupling element having second eyelets, wherein the first coupling element and the second coupling element are interconnectable by a hinge rod, which can be passed through the first and second eyelets engaging between one another.

8. Belt according to claim 1, wherein the belt is a toothed belt.

9. Belt according to claim 8, wherein the belt has a continuous toothing in the region of the end connection.

10. Belt according to claim 9, wherein the toothing has a divided tooth in the region of the end connection.

11. Belt according to claim 1, wherein it is formed at least in part from a thermoplastic material apart from the tension layer and the end connection.

12. Method for producing a belt having a tension layer, a first end portion at a first longitudinal end, a second end portion at a second longitudinal end, and an end connection for connecting the two end portions, wherein the end connection comprises a first connection element, which is fastened to the first end portion, and a second connection element, which is fastened to the second end portion, wherein the first connection element and the second connection element are each formed in one piece from an elongation-resistant material, are releasably interconnectable, and, together with the tension layer, form only a single neutral bending plane, the single neutral bending plane corresponding to a region of the belt of which the length does not change as the belt bends, said method comprising the following steps:

a) connecting the first connection element to the second connection element;

b) connecting the first connection element to the first end portion and connecting the second connection element to the second end portion by melt compression moulding in such a way that the first connection element and the second connection element, together with the tension layer, are positioned on the single neutral bending plane; and c) separating the first connection element from the second connection element.

13. Method according to claim 12, in which, in step b), the first and the second connection element are positioned before the melt compression moulding between a thermoplastic lower part and a thermoplastic upper part.

14. Belt according to claim 1, wherein the first connection element and the second connection element are made of spring steel.

15. Belt according to claim 1, wherein the first connection element and the second connection element are formed from an elongation-resistant material having a modulus of elasticity of at least 190 GPa.

16. Belt according to claim 1, wherein the tension layer comprises a plurality of tension cables.

\* \* \* \* \*